United States Patent [19]

Scheppmann, II

[11] Patent Number: 5,144,153
[45] Date of Patent: Sep. 1, 1992

[54] METHOD AND APPARATUS FOR OPERATING MOTORIZED GATE UPON LOSS OF ELECTRICAL POWER THERETO

[75] Inventor: Leroy E. Scheppmann, II, Fairfield, Iowa

[73] Assignee: Automation and Protection Systems, Inc., El Cajon, Calif.

[21] Appl. No.: 416,068

[22] Filed: Oct. 2, 1989

[51] Int. Cl.⁵ ............................ H02J 9/06; E05F 15/20
[52] U.S. Cl. ................................ 307/66; 49/31; 307/219
[58] Field of Search .................... 307/43–48, 307/64–68, 441, 219, 18–29, 70, 73, 80, 130, 154; 318/369, 440–442, 283; 340/686; 49/12, 25, 31, 29, 138, 141, 279, 280; 187/114, 102–104

[56] References Cited

U.S. PATENT DOCUMENTS

| | | | |
|---|---|---|---|
| 2,986,689 | 5/1961 | Hofer | 49/25 X |
| 4,129,811 | 12/1978 | Pearson | 318/478 |
| 4,210,226 | 7/1980 | Ichioka | 187/29 R |
| 4,308,935 | 1/1982 | Deric | 187/29 R |
| 4,376,471 | 3/1983 | Uchino et al. | 187/29 R |
| 4,423,364 | 12/1983 | Kompelien et al. | 318/440 |
| 4,473,135 | 9/1984 | Yonemoto | 187/29 R |
| 4,490,624 | 12/1984 | Luker | 307/66 |
| 4,563,625 | 1/1986 | Kornbrekke et al. | 318/603 |
| 4,658,543 | 4/1987 | Carr | 49/139 |
| 4,675,538 | 6/1987 | Epstein | 307/64 |
| 4,713,591 | 12/1987 | McCloskey | 318/257 |
| 4,791,443 | 12/1988 | Foley et al. | 354/321 |
| 4,884,831 | 12/1989 | Emon | 292/38 |
| 4,904,880 | 2/1990 | Yoshida | 307/66 |

Primary Examiner—A. D. Pellinen
Assistant Examiner—David Osborn

[57] ABSTRACT

A backup gate controller for a motorized gate detects the loss of power to the gate and causes the gate motor to open the gate in response to loss of power or by an external trigger thereafter. The backup gate controller may be inserted between an existing gate controller and gate motor to bypass the existing controller when power loss is detected. Alternatively, the backup gate controller may be directly connected to the existing gate controller to cause the existing controller to open the gate when power loss is detected. A combined gate controller/backup controller may also be provided. Upon opening the gate, the backup controller and/or the gate controller may prevent the gate from being closed. The backup controller is battery powered and preferably includes a battery charger.

41 Claims, 4 Drawing Sheets fig. 1.

Fig. 3.

METHOD AND APPARATUS FOR OPERATING MOTORIZED GATE UPON LOSS OF ELECTRICAL POWER THERETO

FIELD OF THE INVENTION

This invention relates to motorized gates, doors or other motorized access restricting devices, and more particularly to a method and apparatus for operating such a motorized gate, door or access restricting device upon loss of electrical power thereto.

BACKGROUND OF THE INVENTION

Motorized gates and doors are well known access restricting or security devices for parking lots, buildings and other restricted areas. All such devices will hereinafter be referenced to as "motorized gates". Typically, motorized gates include a motor for opening and closing the gate and an electronic gate controller for controlling operation of the gate motor. The electronic controller may be responsive to a sensor, key, switch, token or other access granting device for opening and closing the gate. A power supply, typically an alternating current (AC) power supply, provides electrical power to the electronic gate controller.

A persistent problem for known motorized gates is the need to allow these gates to open upon loss of electrical power thereto. Such loss of electrical power may occur as a result of a lightning storm, fire, or other disaster, or as a result of commonly occurring power outages. In the event of a loss of power, the inability to open the gate may produce an inconvenience for those in the area who must wait until power is restored in order to leave or enter the area. More importantly, in an emergency or disaster situation, loss of power may trap people in the area preventing evacuation and preventing the entrance of emergency personnel. Accordingly, local ordinances often require motorized gates to provide for opening upon loss of electrical power. Many insurance companies also require the inclusion of a manual override to allow opening the motorized gate upon loss of electrical power.

A simple solution for allowing a motorized gate to be opened upon loss of power is a manual release. The manual release may unlock the gate from the gate motor, so that the gate may be manually opened. However, such a manual release must be mounted inside the restricted area to prevent unauthorized persons from activating the manual release and thereby gaining access to the restricted area. Unfortunately, by placing the manual means inside the gate, activation by fire or other emergency personnel outside the restricted area is precluded.

Another manual gate override is disclosed in U.S. Pat. No. 4,658,543 to Carr, which illustrates a controller which is connected between the main power supply and the gate motor. If there is a malfunction or a power outage, a manual bypass switch allows the user to bypass the controller and directly connect a standby battery to the motor to thereby operate the gate. Unfortunately, as stated above, such a manual bypass switch allows a bypass by unauthorized personnel. Moreover, a battery powered bypass which allows opening and closing the gate under backup battery power may allow the battery to discharge when the gate is in the closed position, thereby again preventing opening of the gate. A manual bypass also precludes automatic operation during an emergency situation.

It is also known in the art to employ a backup door opening system which opens a non-motorized door in response to a power outage. For example, U.S. Pat. No. 4,129,811 to Pearson discloses an emergency door opening system which operates in connection with a ventilation system used in barns or other structures which house animals. The ventilating system normally provides air ventilation to the barn. When power to the ventilating system is lost, a relay system energizes a battery powered motor to open a door on the barn and provide emergency ventilation. The Pearson reference does not disclose or suggest a backup system which could be employed with a motorized gate, the motor of which opens and closes during normal use, to allow operation of the motorized gate upon loss of electrical power.

The art has heretofore suggested other systems for operating a motorized gate in the event of power loss thereto. For example, U.S. Pat. No. 4,490,624 to Luker discloses a door control apparatus for an automatic door which includes a main power supply which normally drives a main door motor to open and close the door. A second battery power supply is provided to operate a second door motor. A relay detects when there is a main power supply failure and thereby connects the battery to the second motor for driving the door via a common drive assembly. Unfortunately, the Luker reference requires the use of a second drive motor for emergency conditions. The need for a second motor adds greatly to the cost, and makes it difficult to adapt the system to existing motorized doors or gates.

The art has also heretofore provided uninterruptable power supplies (UPS) for use in connection with computers or other critical systems. A UPS, for example as described in U.S. Pat. No. 4,675,538 to Epstein, typically substitutes a backup battery for the normal AC power service upon loss of normal AC power. However, such UPS's are not appropriate for use in motorized gates for at least two reasons. First, a UPS will continue to allow the motorized gate to open and close until its battery discharges. If the battery discharges when the gate is closed, emergency exit and entry is again prevented. Moreover, UPS's tend to be expensive because they are designed to provide uninterrupted power with a smooth switch over in addition to long term battery power for use during long power losses. While this expense may be justified for computer systems, the expense would preclude use of a UPS with a motorized gate.

Backup power supplies have also been incorporated into other expensive equipment. For example, U.S. Pat. No. 4,791,443 to Foley et al. discloses a backup power supply for photographic processing equipment which allows any film in progress to be processed. There is no disclosure or suggestion of any backup power supply for a motorized gate.

SUMMARY OF THE INVENTION

It is therefore an object of the invention to provide an improved method and apparatus for operating a motorized gate upon the loss of electrical power thereto.

It is another object of the invention to provide a method and apparatus for operating a motorized gate upon loss of electrical power which may be adapted to an existing motorized gate without requiring additional motors or other costly components.

It is yet another object of the invention to provide a method and apparatus for operating a motorized gate upon loss of electrical power which does not require the use of costly uninterruptable power supplies.

These and other objects and advantages of the present invention are provided by a backup gate operating apparatus which is adapted for use with a motorized gate, the motorized gate including a motor for opening and closing the gate and an electronic gate controller for controlling operation of the motor, with the electronic gate controller being powered from a gate power supply. The backup gate operating apparatus includes a detector which is adapted for electrical connection to the gate power supply for sensing the loss of power from the gate power supply. A battery powered backup gate controller is also provided for connection to the detector for controlling the gate motor to open the gate in response to the loss of power or to an external trigger thereafter. According to the present invention, the backup controller automatically takes control of the motorized gate when a power loss is detected and opens the gate and maintains the gate open until power is restored or the gate is manually closed. Preferably, the backup controller will only allow the gate to open once, and will then disable itself after the gate is opened.

In one embodiment, the backup gate controller is directly connected to the gate motor to bypass the electronic gate controller and directly control the motor to open the gate in response to loss of power. In another embodiment, the controller is directly connected to the existing electronic gate controller to cause the existing electronic gate controller to control the gate motor to open the gate. It will also be understood by those having skill in the art that the backup gate operating apparatus of the present invention may be retrofitted onto existing motorized gates or may be designed as part of a newly manufactured gate. In either case, the backup gate controller may be integrated into the electronic gate controller.

The backup gate operating apparatus and method of the present invention opens a motorized gate in response to a power loss, using the pre-existing gate motor. A second motor is not required. Moreover, the battery powered backup gate controller will only allow the gate to open once, to thereby ensure that the backup controller's battery does not fully discharge when the gate is closed. Costly uninterruptable power supplies are also not required. Low cost backup protection for motorized gates is thereby provided, to enhance safety and comply with local ordinances and insurance requirements.

The backup gate operating apparatus and method of the present invention may immediately open the gate upon loss of power. Alternatively, upon loss of power, the gate may wait for a command from an external trigger, such as a manual emergency switch or other signal, to open the gate. This emergency switch or signal may be mounted in a standard lockbox or adjacent to the backup gate operating apparatus for easy access by emergency crews. An automatic delay may also be provided to ignore momentary power outages.

The backup gate controller may be designed to operate in connection with a limit switch or position sensor which typically indicates that a gate is open, and a lock which locks the gate in the closed position. In particular, if the gate is closed, the lock may be activated to unlock the gate before it is opened. Once the open gate position sensor is detected, a braking force may be applied to the motor to stop the gate. The backup gate controller may also be coupled to an alarm which generates an alarm signal when the motor is activated. This alarm signal may be coupled to a light or other known alarm means. Finally, if the gate does not open when the motor is energized, a second alarm signal may be generated to indicate a stuck gate or other fault.

BRIEF DESCRIPTION OF THE DRAWINGS

Some of the features and advantages of the invention having been stated, others will appear as the description proceeds, when taken in connection with the accompanying drawings, in which.

DETAILED DESCRIPTION OF THE PREFERRED EMBODIMENT

While the present invention will be described hereinafter with particular reference to the accompanying drawings, it is to be understood at the outset of this description that persons skilled in the applicable arts will be able to modify the specific arrangements herein described and shown while continuing to achieve the desired result of this invention. Accordingly, the description and illustrations are to be taken as broad, teaching disclosures directed to persons skilled in the appropriate arts, and not as restricting the scope of the present invention.

Figure 1:
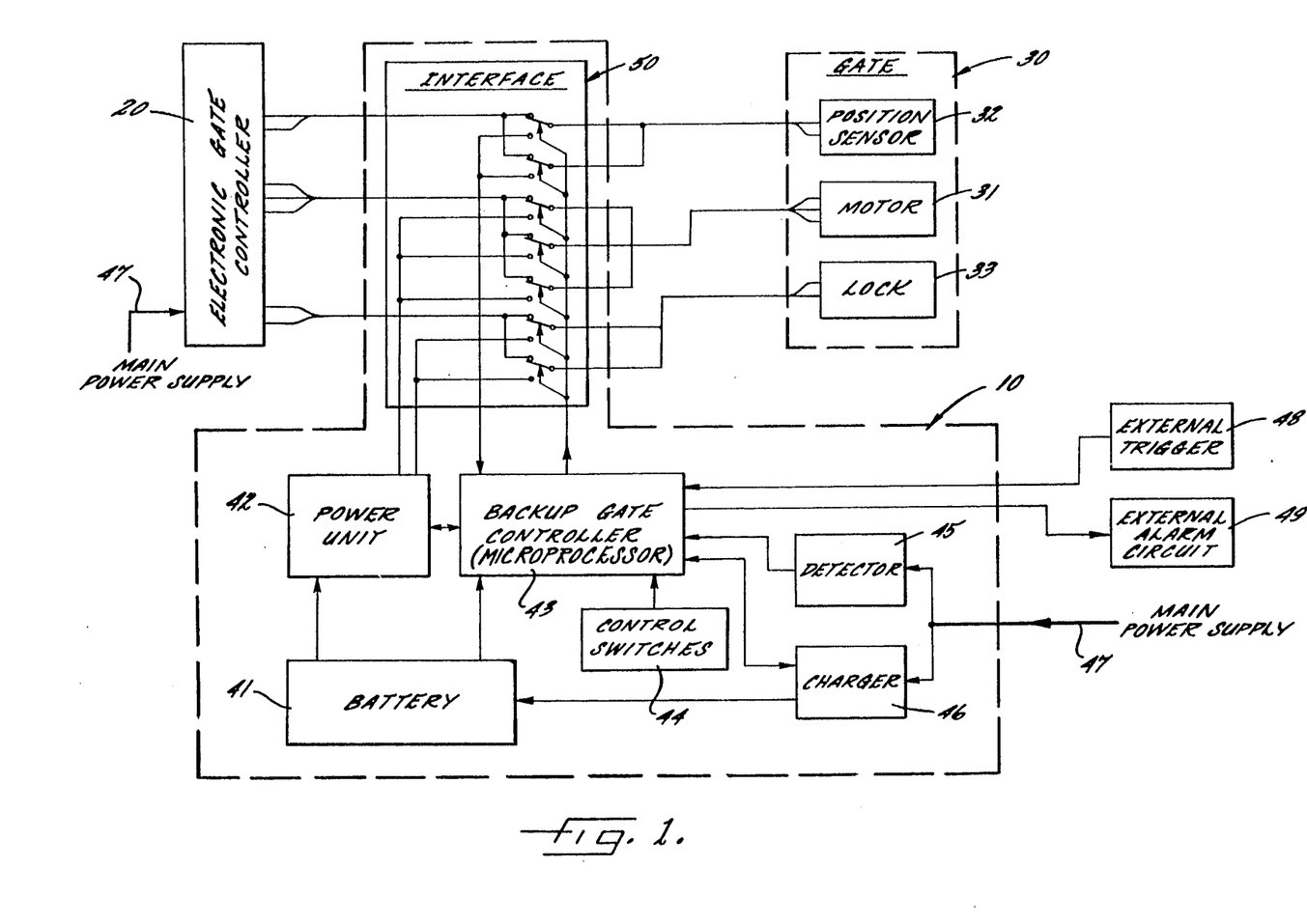
FIG. 1 is a schematic block diagram of a backup gate operating apparatus according to the invention.

FIG. 1 illustrates a backup gate operating apparatus 10 adapted for use with a motorized gate 30. The motorized gate is controlled by an electronic gate controller 20. The gate 30 includes a gate motor 31 for opening and closing the gate, a position sensor 32 to indicate the position of the gate 30, and lock 33. The gate controller 20 typically controls gate 30 via a series of wired connections in a manner well known to those having skill in the art. Relay interface 50 which comprises a number of relays (shown schematically) may be connected between controller 20 and gate 30. Preferably, relay interface 50 is a part of the backup gate operating apparatus 10. This relay interface 50 allows the switching of control signals and power so that they can flow between the gate 30 and the electronic gate controller 20 or between the gate 30 and the backup gate operating apparatus 10. Electronic gate controller 20 is powered from a main power source 47. During normal operation, gate 30 is powered by main power supply 47 through electronic gate controller 20.

The backup gate operating apparatus 10 includes an alternate gate power supply 41, such as a battery or batteries, and a power unit 42 for regulating the power supplied by batteries 41 and for converting the battery voltage and current levels to those levels necessary to operate the motor 31 and lock 33 of gate 30. A backup gate controller 43, which may be a microprocessor or logic unit, controls the operation of apparatus 10, as described below. Control switches 44 allow setting of various options, as described below. A power loss detector 45 senses the loss of power at main supply 47. A battery charger 46 maintains batteries 41 fully charged.

Gate power supply 47 is also connected to the power loss detector 45 and battery charger 46. An external trigger 48 and a external alarm circuit 49 may also be provided, as described below. It will be understood by those having skill in the art that a single backup gate operating apparatus 10 may control more than one gate. For example, this could be accomplished by expansion ports and/or additional printed circuit boards.

In the embodiment illustrated in FIG. 1, the backup gate operating apparatus 10 is connected between the gate 30 and the gate controller 20 via interface 50. As described in detail below, upon loss of power, backup gate controller 43 controls interface 50 to disconnect electronic gate controller 20 and connect backup gate controller 43 and power unit 42 to the gate 30. It will be understood by those having skill in the art that interface 50 may replace an existing relay interface to allow the alternate control paths described above.

The backup gate operating apparatus 10 allows the gate 30 to open upon loss of electrical power thereto. Such loss of electrical power may occur as a result of an electrical storm, fire, or other disaster, or as a result of commonly occurring power outages. The backup gate operating apparatus 10 includes a well known power detector 45 which is adapted for electrical connection to the main power supply 47 for sensing loss of power from the main power supply 47. Battery powered backup gate controller 43 is connected to the detector 45 for controlling the gate motor 31 to open the gate 30 in response to the loss of power.

According to the present invention, the backup controller 43 automatically takes control of the motorized gate 30 when the power loss is detected by causing the relays of interface 50 to switch, as illustrated schematically in FIG. 1. Backup controller 43 opens the gate 30 and maintains the gate 30 open until power is restored or until the gate 30 is manually closed. The backup controller 43 will only allow the gate 30 to open once. Alternatively, the gate 30 can open a predetermined number of times, for example twice, during one continuous power outage, assuming there is sufficient capacity in the battery 41 for operation. However, in the preferred embodiment, to ensure that the backup controller's alternate gate power supply 41 (battery) is not fully discharged by cycling the gate 30 open and closed (possibly leaving the gate 30 closed), the backup gate controller 43 will maintain the gate 30 in the open position once it is first reached in the power outage condition.

The backup gate operating apparatus 10 and method of the present invention may immediately open the gate 30 upon loss of power from the gate power supply 47. Alternately, upon loss of power the backup gate operating apparatus 10 and method of the present invention may wait for a command on the external trigger or emergency switch 48 or other signal, to open the gate 30. Suitable external triggers include roadway loop detectors, radio receivers, strobe light receivers, telephonic controllers, or the like. A control switch 44 may indicate selection of automatic or external trigger operation. The external trigger 48 may be mounted in a standard lock box or adjacent to the backup gate operating apparatus 10 for easy access by emergency crews. Detector 45 or backup gate controller 43 may be configured to provide a predetermined delay (for example, ten seconds) before triggering, to ignore momentary power outages.

The backup gate controller 43 may be designed to operate in connection with a position sensor 32 which typically indicates that the gate 30 is open, and a lock 33 which locks the gate 30 in a closed position. Both "normally open" and "normally closed" limit switches may be employed, with a control switch 44 indicating the type of switch employed. If the gate 30 is closed, the lock 33 may first be activated to unlock the gate 30. Once the position sensor 32 indicates that the gate has been opened, a braking power may be applied to the motor 31 to stop the gate 30. Braking power may be selected by via a control switch 44.

The backup gate controller 43 may also be coupled to an external alarm circuit 49, which generates an alarm signal when the motor 31 is activated for opening the gate 30 When there is a power outage. This alarm signal may be coupled to a light or other known alarm means. If the gate 30 does not open when the motor 31 is energized, a second alarm signal may be generated to indicate that the gate 30 is stuck or that a malfunction has occurred. These alarm signals are conventionally activated by software programs or logic elements.

Figure 2:
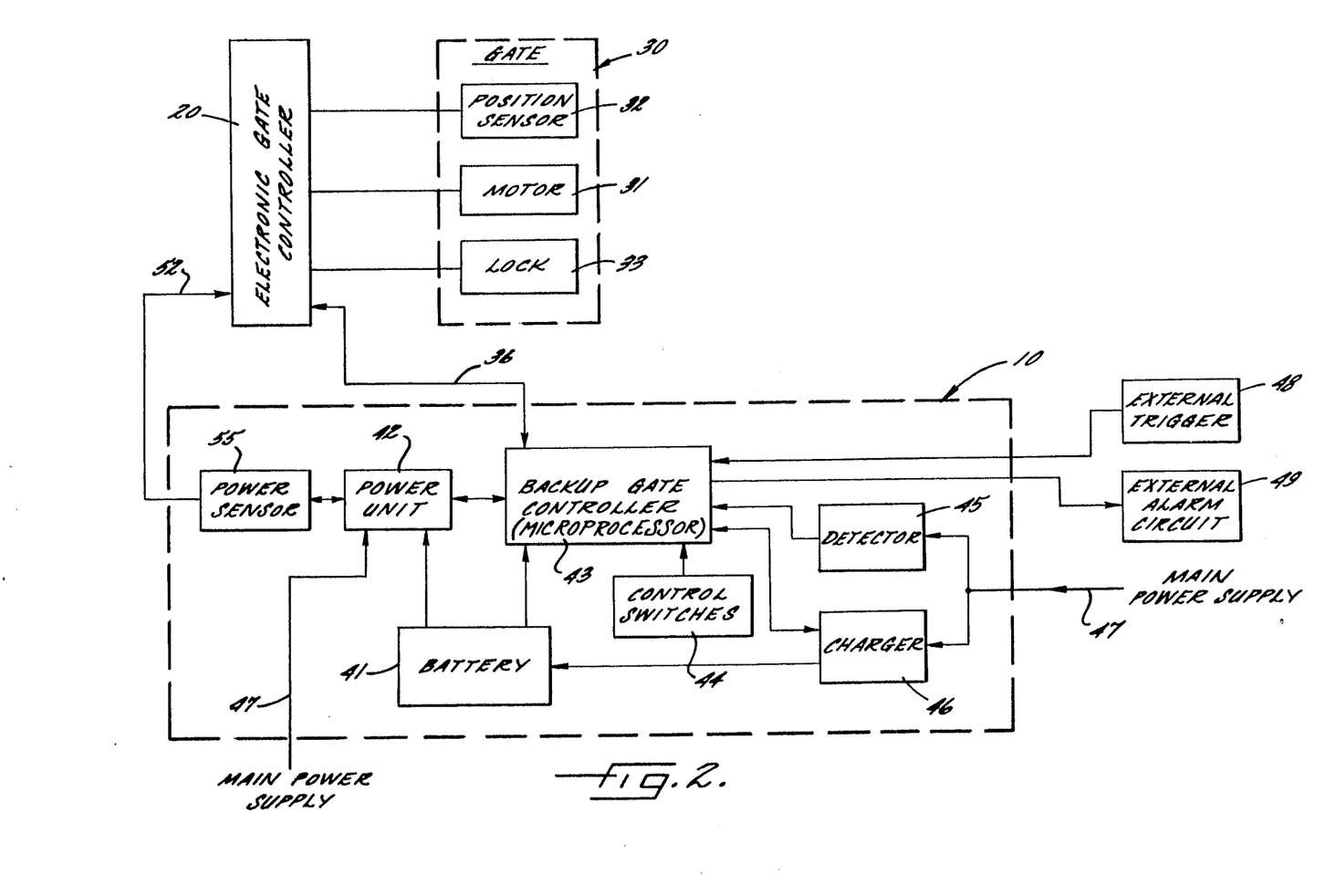
FIG. 2 is a schematic block diagram of a second embodiment of the invention.

The embodiment illustrated in FIG. 1 places the backup gate operating apparatus 10 between the existing electronic gate controller and gate 30 Referring now to FIG. 2, a second embodiment of the present invention is shown in which the backup gate operating apparatus 10, and particularly the backup gate controller 43, is directly connected to the existing electronic gate controller 20 via connections 36 and 52 to direct operation to the existing electronic gate controller 20 when loss of main power is detected. Connection 36 provides for feedback between the electronic gate controller 20 and backup gate controller 43 so that gate status information may be transferred therebetween. A suitable alternative may have feedback connections between the gate 30, electronic gate Controller 20, and backup gate controller 43.

In FIG. 2, main power supply 47 and batteries 41 are connected to power unit 42 which supplies power via connection 52 to the electronic gate controller 20 and then to the gate 30. Power sensor 55 is connected between the power unit 42 and electronic gate controller 20 for detecting the power being consumed by the electronic gate controller 20 and the gate 30. If a predetermined amount of power is being consumed when under battery power, power sensor 55 respectively deenergizes the electronic gate controller 20 and gate 30. This power sensor 55 may be a part of the power unit 42 in another embodiment or it may not be needed at all.

Figure 3:
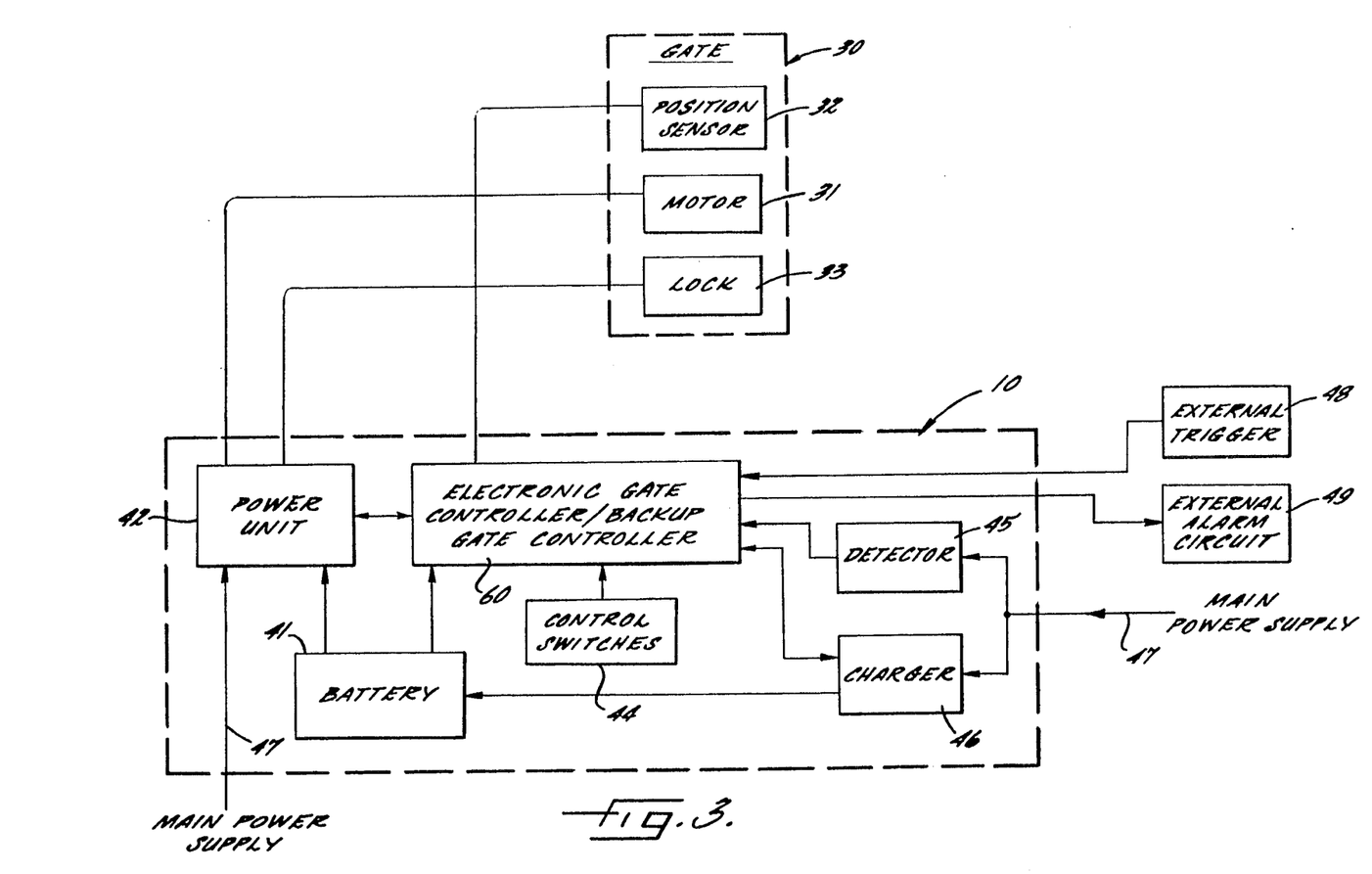
FIG. 3 is a schematic block diagram of a third embodiment of the invention.

The embodiments of FIGS. 1 and 2 are particularly designed to allow the backup gate operating apparatus 10 of the present invention to be retrofitted onto an existing motorized gate or electronic gate controller. Especially, for newly manufactured gates, an electronic gate controller and a backup gate controller may be provided in a single integrated unit, such as a an electronic o microprocessor or logic unit. FIG. 3 illustrates such an integrated controller 60 which provides the functions of well known electronic gate controllers and the functions of the backup gate controller of the present invention. Here, as compared to FIGS. 1 and 2, main power supply 47 and battery 41 are connected to power unit 42 which is directly connected to the gate 30. There may be many other ways to supply power to the gate 30.

Figure 4:
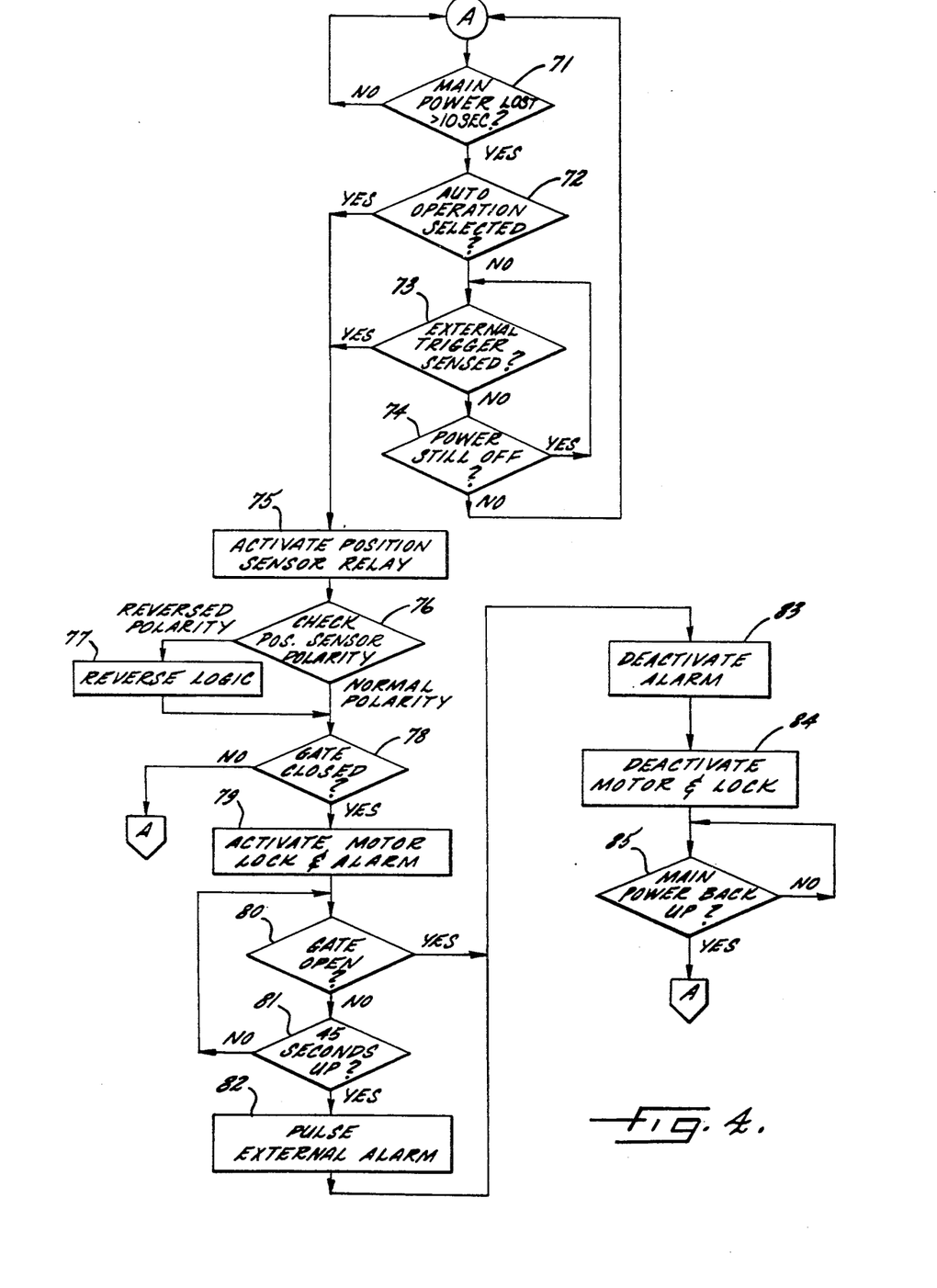
FIG. 4 is a flow chart representation of the sequence of operations performed by the backup gate operating apparatus of the invention.

Referring now to FIG. 4, a flow chart representation of the sequence of operations performed by the backup gate operating apparatus 10 will now be described. These operations may be performed by a backup gate controller 43 which is connected between a gate controller 20 and a gate 30 (FIG. 1), or which is directly connected to an electronic gate controller 20 (FIG. 2). These operations may also be performed by a backup gate controller which is a part of integrated controller 60 (FIG. 3).

Referring again to FIG. 4, at block 71, the main power supply 47 is continuously monitored via detector 45. Once a power supply loss is detected for a predetermined time, such as 10 seconds, the state of control switches 44 are checked to see if automatic or external operation has been selected (block 72). If external operation was selected, the external trigger 48 is monitored, at block 73, until actuation of external trigger 48 is sensed. If power is restored before the external trigger 48 is activated (block 74) processing returns to point "A".

When the external trigger 48 is actuated (block 73), or for automatic operation, as soon as main power is lost (block 72), the relay, preferably in interface 50, Which controls position sensor 32 is activated (block 75). The position sensor 32 polarity is then checked at block 76, so that an open gate may be correctly detected. A control switch 44 may be provided to check for a normally open (normal) or a normally closed (reversed) position sensor 32. If a reverse polarity has been indicated, the logic is reversed at block 77 to detect position sensor 32 in a closed position. A check is then made (block 78) to ensure that the gate 30 is actually closed. If the gate is not closed (i.e. open), then operation returns to point "A". If the gate 30 is closed, it is opened by activating the motor 31 and lock 33 (block 79). External alarm 49 may also be activated.

Operation then waits to detect an open gate by detecting a change in the state of position sensor 32 (block 80). If the change in the position sensor 32 is not detected within forty-five seconds or some other predetermined time period (block 81), indicating the gate 30 is stuck, or another fault is present, the external alarm circuit 49 may be pulsed (block 82) until automatically or manually reset (or until battery 41 is depleted) to provide a second alarm which indicates a stuck gate. The pulsing alarm is deactivated at (block 83).

If the change in the position sensor 32 is detected, indicating that the gate 30 has properly opened (block 80), the external alarm circuit 49 is also deactivated (block 83). The motor 31 and lock 33 are deactivated (block 84) after the alarm is deactivated (block 83). The backup gate controller 43 waits for the main power 47 to be restored (block 85) for providing an automatic reset. It is understood by one skilled in the art to provide for a means to externally trigger a reset. Once reset, the operation returns to point "A".

In the drawings and specification, there have been set forth preferred embodiments of the invention, and although specific terms are employed, they are used in a generic and descriptive sense only and not for purposes of limitation, with the scope of the invention being set forth in the following claims.

That which is claimed is:

1. A motorized gate comprising:
a gate;
a gate motor for opening and closing said gate;
an electronic gate controller for controlling operation of said gate motor;
a gate power supply for providing electrical power to said electronic gate controller;
gate power detecting means, electrically connected to the gate power supply, for sensing loss of power from said gate power supply;
backup gate controlling means connected to said gate power detecting means and said gate motor, for causing said gate motor to open said gate during a loss of power, said backup gate controlling means including a control switch for selecting one of an automatic operating mode and an external trigger operating mode, said backup gate controlling means when in the automatic operating mode opening said gate responsive to a loss of power, and said backup gate controlling means when in the external trigger operating mode opening said gate in response to a loss of power and an external trigger; and
one of said gate power detecting means and said backup gate controlling means including delay means for ignoring momentary power outages;
whereby the motorized gate may be opened in response to loss of power thereto or in response to a loss of power and an external trigger.

2. The motorized gate of claim 1 wherein said backup gate controlling means is directly connected to said gate motor, for bypassing the electronic gate controller and directly causing said gate motor to open the gate.

3. The motorized gate of claim 1 wherein said backup gate controlling means is directly connected to the electronic gate controller, for causing said electronic controller to control the gate motor to open the gate.

4. The motorized gate of claim 1 further comprising external signal triggering means operatively connected to said backup gate controlling means for producing an external trigger therefor, and wherein said external signal triggering means is selected from the group consisting of roadway loop detectors, radio receivers, strobe light receivers, and telephonic controllers.

5. The motorized gate of claim 1 wherein said backup gate controlling means further comprises means for maintaining the gate open during a loss of power.

6. The motorized gate of claim 1 wherein said backup gate controlling means causes said gate motor to open the gate only one time during a loss of power.

7. The motorized gate of claim 1 wherein said backup gate controlling means causes said gate motor to open said gate a predetermined number of times during one continuous loss of power.

8. The motorized gate of claim 1 wherein said backup gate controlling means further comprises means for preventing said gate motor from closing the gate during a loss of power.

9. The motorized gate of claim 1 further comprising a lock for locking the gate; and wherein said backup gate controlling means comprises means for opening said lock during a loss of power.

10. The motorized gate of claim 9 wherein said backup gate controlling means opens said lock in response to loss of power and activation of external signal triggering means.

11. The motorized gate of claim 1 wherein said backup gate controlling means further comprises means for applying a braking force to said gate motor when said gate is open.

12. The motorized gate of claim 1 wherein said backup gate controlling means further comprises means for generating an alarm signal, during a loss of power when the gate is being opened.

13. The motorized gate of claim 1 further comprising position sensing means for sensing that said gate is open, and wherein said backup gate controlling means further comprises alarm generating means connected to said position sensing means, for generating an alarm signal in response to the gate not opening under control of said operating means.

14. The motorized gate of claim 1 further comprising battery power supply means connected to said backup gate controlling means, for providing electrical power to said backup gate controlling means.

15. The motorized gate of claim 14 further comprising battery charging means, connected to said gate power supply and to said battery power supply means, for charging said battery power supply means.

16. The motorized gate of claim 1 wherein said backup gate controlling means includes an electronic logic circuit.

17. The motorized gate of claim 1 wherein said backup gate controlling means includes a stored program microprocessor.

18. The motorized gate of claim 1 wherein said electronic gate controller and said backup gate controlling means are integrated into a single electronic unit.

19. The motorized gate of claim 18 wherein said single electronic unit includes an electronic logic unit.

20. The motorized gate of claim 18 wherein said single electronic unit includes a stored program microcomputer.

21. The motorized gate of claim 1 wherein said backup gate controlling means is directly connected to said electronic gate controller for providing gate status and control information therebetween.

22. The motorized gate of claim 1 further comprising feedback means connected between said gate, said electronic gate controller, and said backup gate controlling means for providing transfer of gate status and control information therebetween.

23. The motorized gate of claim 1 further comprising a power sensing means for sensing the power usage of said motor and said electronic gate controller.

24. The motorized gate of claim 23 wherein said power sensing means, in response to sensing a predetermined amount of power being consumed, deenergizes said motor and said electronic gate controller.

25. A method of controlling a motorized gate, the motorized gate comprising a gate motor for opening and closing the motorized gate and an electronic gate controller for controlling operation of the gate motor, the electronic gate controller being powered from a gate power supply, said method comprising the steps of:
 detecting the loss of power to the gate power supply;
 monitoring the state of a control switch, the control switch for selecting one of an automatic operating mode and an external trigger operating mode for said gate during loss of power to the gate power supply; and
 causing the gate motor to open the gate in response to detected loss of power when the control switch is in the automatic state, and causing the gate motor to open the gate in response to detected loss of power for a predetermined time period for ignoring momentary power outages and an external trigger when the control switch is in the external trigger state.

26. The method of claim 25 wherein said causing step comprises the step of:
 directly causing said gate motor to open the gate in response to detected loss of power.

27. The method of claim 25 wherein said causing step comprises the step of:
 causing said electronic gate controller to control operation of the gate motor to open the gate in response to detected loss of power.

28. The method of claim 25 wherein the external trigger is a trigger produced by one of the group consisting of roadway loop detectors, radio receivers, strobe light receivers, and telephonic controllers.

29. The method of claim 25 wherein said causing step is followed by the step of:
 maintaining the gate open in response to detected loss of power.

30. The method of claim 25 wherein said causing step comprises the step of:
 causing the gate motor to open the gate only one time in response to detected loss of power.

31. The method of claim 25 wherein said causing step comprises the step of:
 causing the gate motor to open the gate a predetermined number of times in response to one continuously detected loss of power.

32. The method of claim 25 wherein said causing step is followed by the step of:
 disabling further operation of the gate motor.

33. The method of claim 25 wherein said causing step is followed by the step of:
 preventing the gate motor from closing the gate.

34. The method of claim 25 wherein the motorized gate further comprises a lock for locking the gate and wherein said causing step is preceded by the step of:
 causing the lock to unlock the gate in response to detected loss of power.

35. The method of claim 25 wherein said causing step is followed by the step of:
 applying braking force to the gate motor when the gate is open.

36. The method of claim 25 wherein said detecting step is followed by the step of:
 generating an alarm signal in response to detected loss of power when the gate is being opened.

37. The method of claim 25 wherein said causing step is followed by the step of:
 generating an alarm signal if the gate does not open in response to said causing step.

38. The method of claim 25 wherein said causing step is preceded by the step of sensing that the gate is closed; and wherein said causing step comprises the step of causing the gate motor to open the gate in response to detected loss of power when the gate is closed.

39. A motorized gate comprising:
 a gate movable between an opened position and a closed position;
 a gate motor for opening and closing said gate;
 and electronic gate controller for controlling operation of said gate motor;
 a gate power supply for providing electrical power to said electronic gate controller;
 gate power detecting means, electrically connected to the gate power supply, for sensing loss of power from said gate power supply;
 a gate position sensor for producing a closed gate signal when said gate is in the closed position;
 backup gate controlling means connected to said gate power detecting means, said gate position sensor, and said gate motor, for operating said gate motor to open said gate in response to loss of power and the closed gate signal so that said backup gate controlling means does not activate said gate motor when said gate is in the opened position; and one of said gate power detecting means and said backup gate controlling means including delay means for ignoring momentary power outages;

whereby the backup gate controlling means will not waste power by operating said gate motor when said gate is in the opened position.

40. The motorized gate of claim 39 wherein said backup gate controlling means includes a control switch for selecting one of an automatic operating mode and an external trigger operating mode, wherein said backup gate controlling means when in the automatic operating mode opens said gate responsive to a loss of power, and wherein said backup gate controlling means when in the external trigger operating mode opens said gate in response to a loss of power and an external trigger.

41. The motorized gate of claim 39 wherein said gate power detecting means further comprises delay means for ignoring momentary power outages of about 10 seconds.

* * * * *